United States Patent

[11] 3,598,433

[72] Inventor Anthony P. Savickas
2713 N.E. 27th Ave., Pompano Beach, Fla. 33064
[21] Appl. No. 858,329
[22] Filed Sept. 16, 1969
[45] Patented Aug. 10, 1971

[54] MOLDED PLASTIC FITTING
2 Claims, 6 Drawing Figs.
[52] U.S. Cl. ................................................ 287/54 C, 297/445
[51] Int. Cl. .................................................. F16b 7/00
[50] Field of Search ....................................... 287/189.36 H, 54 A, 54 B, 54 C; 297/440, 445; 52/656

[56] References Cited
UNITED STATES PATENTS
| | | | |
|---|---|---|---|
| 1,460,928 | 7/1923 | Tilden | 287/54 C |
| 1,840,048 | 1/1932 | Michelman | 287/54 C |
| 3,100,555 | 8/1963 | Ashton | 287/54 B |
| 3,338,605 | 8/1967 | Stoeber | 287/54 A |

Primary Examiner—David J. Williamowsky
Assistant Examiner—Wayne L. Shedd
Attorney—Salvatore G. Militana ABSTRACT: A molded plastic fitting particularly useful for joining together two tubular members. The fitting is a generally cylindrical molded plastic body having first and second ends, the first end being recessed axially to fit the outside of one tubular member, and the second end being radially inwardly offset from the first end by a circumferential step and dimensioned to fit inside the end of the other tubular member with the step abutting that end of the tubular member. Both ends of the molded body are bonded to the tubular members. A fastener passes through a transverse wall inside the molded body to clamp the molded body against the first tubular member. Both ends of the tubular member are constructed to give resiliently for proper fitting with the respective tubular members.

PATENTED AUG 10 1971 3,598,433

INVENTOR.
ANTHONY P. SAVICKAS.
BY
SETTLE & OLTMAN.
ATT'YS.

3,598,433

1

MOLDED PLASTIC FITTING

BACKGROUND OF THE INVENTION

It is proposed by the present inventor to build a variety of articles such as furniture from thermoplastic tubular members such as polyvinyl chloride piping. The thermoplastic piping is well suited, particularly for lounging furniture for porch, patio or outdoor use since it is rugged, weather resistant and will clean easily. However, a problem arises in attempting to join such tubular members together securely without requiring complicated fasteners which would detract from the appearance of the furniture. The joint structure must be one which can be fabricated economically and it must blend in with the furniture to give the final product a neat and professional appearance.

SUMMARY OF THE INVENTION

The present invention provides a molded plastic fitting which blends harmoniously with the plastic tubular members, and which forms a neat appearing, strong and durable joint between two tubular members extending at an angle with respect to each other. In a preferred embodiment, the plastic fitting is a generally cylindrical body having a circumferential step between an enlarged end and a reduced end. The enlarged end has an axially extending concave recess forming two projecting side wings which are resilient so as to fit closely and resiliently with the outside of one of the tubular members. The radius of the concave recess is smaller than that of the adjoining tubular member so that the recessed end of the cylindrical body fits closely and resiliently with the tubular member. The reduced end of the molded body is also tubular and has longitudinal slots formed in it to provide resilient sections which fit resiliently inside the other tubular member. Both ends of the molded body are secured by bonding to the respective tubular members. A fastener extends through a transverse wall in the molded body into the first tubular member to clamp the plastic fitting to that tubular member. This assures a firmly secured joint.

Accordingly, it is an object of the present invention to provide an improved fitting for joining two tubular members together at an angle.

Another object of the invention is to provide a molded plastic fitting which will blend in harmoniously with the tubular members so that the resulting joint is neat and has no exposed unsightly fasteners.

A further object of the invention is to provide a fitting which can be molded to its final configuration from a thermoplastic material such as polyvinyl chloride plastic.

Still another object of the invention is to provide a fitting which can be secured to tubular members in order to join them together by bonding.

Other objects of this invention will appear from the following description and appended claims, reference being had to the accompanying drawings forming a part of this specification wherein like reference characters designate corresponding parts in the several views.

ON THE DRAWINGS

2

Figure 5:
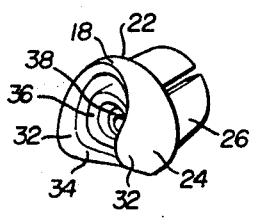
FIG. 5 is a perspective view of one end of a molded plastic fitting included in FIGS. 1 through 4.
Figure 6:
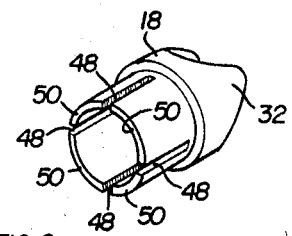

FIG. 6 is a perspective view of the plastic fitting of FIG. 5 as viewed from the opposite end as compared to FIG. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
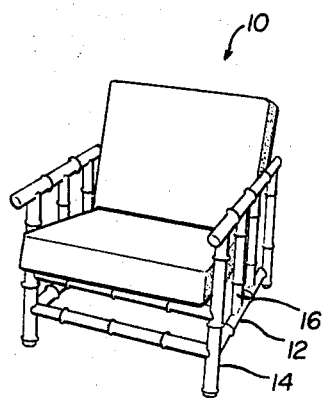
FIG. 1 is a perspective view of a chair made from plastic tubular members and fittings in accordance with the invention.
Figure 2:
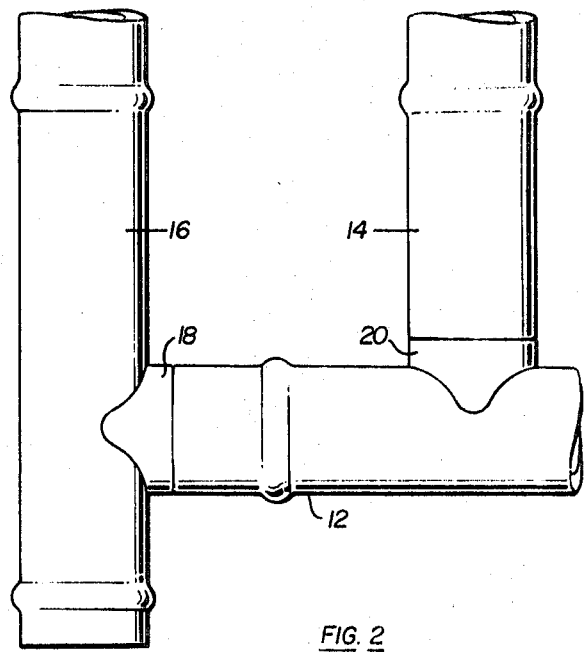
FIG. 2 is an enlarged fragmentary view of portions of three tubular members showing plastic fittings which provide the required joints between tubular members.
Figure 3:
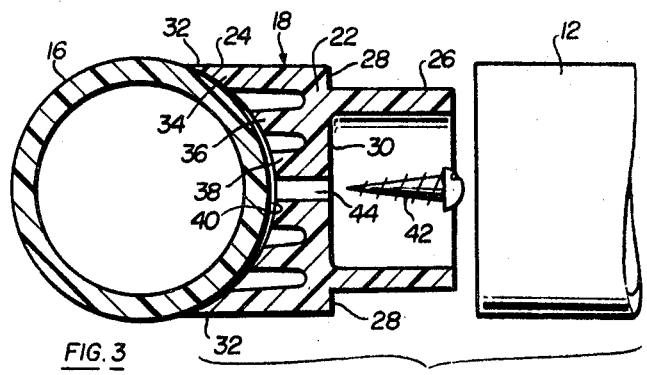
FIG. 3 is a horizontal sectional view, partly exploded, showing a plastic fitting just before it is secured to two tubular members to form a joint.

The chair 10 of FIG. 1 is made up of tubular members such as 12, 14 and 16, portions of which are shown in an enlarged view in FIG. 2. Tubular members 12 and 16 are joined together at a right angle by a molded plastic fitting 18, and tubular members 12 and 14 are joined together at a right angle by another molded plastic fitting 20. Portions of members 12 and 16 along with the plastic fitting 18 are shown in FIG. 3 in a disassembled condition and in FIG. 4 in an assembled condition. The plastic fitting 18 is shown from two perspectives in FIGS. 5 and 6.

The tubular members 12, 14 and 16 are preferably made of thermoplastic material such as polyvinyl chloride plastic which is extruded to the desired tubular shape. Such plastic tubing is sometimes used for piping, but it lends itself well to use in furniture such as the chair 10 of FIG. 1 because the polyvinyl chloride plastic material is strong, durable and can be cleaned very easily. Such furniture is particularly suitable for outdoor use or for use on a porch or patio. Decorative articles other than furniture can be fabricated from such tubular members.

The plastic fittings such as 18 and 20 form joints between the respective tubular members which are unusually neat in appearance, which blend harmoniously with the tubular members themselves, and which can be fabricated economically by injection molding of polyvinyl chloride plastic or other thermoplastic material.

The fitting 18 consists of a generally cylindrical body 22 which has an enlarged end 24 and a reduced end 26. The ends 24 and 26 are offset radially from each other by a circumferential step 28. An interior wall 30 extends transversely across the inside of the body 22, preferably even with the step 28.

The enlarged end 24 of the body 22 is recessed axially to form two projecting side wings 32 defining a concave face. Projecting axially from the wall 30 are three tubular rings 34, 36 and 38 which are concentrically spaced with respect to each other and the ends of which form the concave face referred to previously. The enlarged end 24 of the body 22 could be solid, but it is preferable to form this end with concentric rings 34, 36 and 38 because of the relative ease of injection molding the rings. At least two such rings are needed. Alternatively, radial ribs could be used, the idea being to provide sufficient weldable surface.

Figure 4:
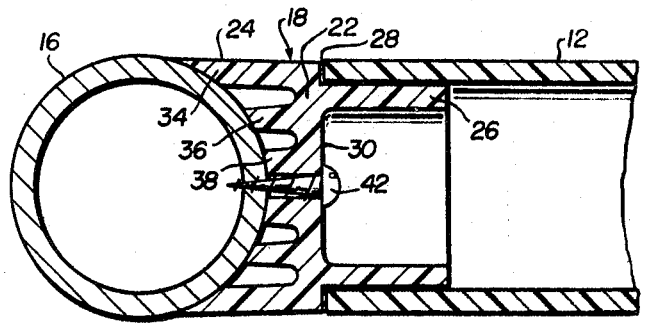
FIG. 4 is a horizontal sectional view similar to FIG. 3 but showing the joint and the tubular members after they have been secured adhesively together.

The radius of the concave face defined by the ends of the rings 34, 36 and 38 is smaller than the radius of the outside of tubular member 16 so that when the fitting 18 is placed against the tubular member 16 in the manner shown in FIG. 3, there is a small gap at 40. The side wings 32 are resilient, so that when the fitting 18 is forced against the tubular member 16, the wings 32 spread outwardly slightly enabling the fitting to fit snugly against the tubular member in the manner shown in FIG. 4, thus eliminating the gap 40. This forcing of the fitting 18 against the tubular member 16 may initially be accomplished by means of a screw 42 which extends through the opening 44 at the center of the fitting 18 and screws through the material of the tubular member 16 as shown in FIG. 4.

Even though a screw 42 is provided, the main securing force for holding the fitting 18 against the tubular member 16 is accomplished by bonding, preferably by adhesively securing member 18 to member 16 by means of solvent welding. The fitting 18 is molded by injection molding from thermoplastic material such as polyvinyl chloride plastic material. The members 12 and 16 are also made of thermoplastic material such as polyvinyl chloride plastic material, although these members are preferably extruded. Initially, a suitable solvent cement is applied to the concave faces of rings 34, 36 and 38, and when the fitting 18 is pressed against member 16, and the solvent cement dries, it firmly welds or bonds the members 18 and 16 together. The screw 42 acts as a clamp to hold the members 18 and 16 together until the solvent cement dries. The solvent cement actually dissolves some of the material of members 16 and 18 and causes this dissolved material to fuse together forming a very tight joint.

The reduced end 26 of the fitting 18 is tubular, and has at least two longitudinally extending slots such as the slots 48 shown in FIG. 6. These slots 48 define resilient sections 50. The diameter of the reduced end 26 is slightly larger than the inside diameter of tubular member 12, and the resilient sections 50 give slightly when the reduced end 26 is inserted into the tubular member 12. Thus, the end 26 fits snugly and resiliently with the tubular member 12. The end 26 is preferably adhesively secured to the inside of tubular member 12 by solvent welding with a suitable solvent cement. The solvent cement is applied to the tubular end 26 before it is inserted into the member 12, it dissolves some of the material of members 26 and 12 and this material fuses together and dries to form a secure bond between members 26 and 12. A suitable solvent cement for joining ends 24 and 26 to the respective tubular members contains tetrahydrofuran.

Alternative fastening means can be used. In place of the screw, a rivet or a T-nut may be used. Rather than solvent welding, it is possible to use hot tool welding, ultrasonic welding, or high frequency inductive welding.

Thus, the plastic fitting 18 is completely compatible with the tubular member 12 and 16 and can be bonded securely to them to provide a very tight joint. The step 28 butts up against the end of tubular member 12 when the joint is completed so that the outside surface of fitting 18 and that of tubular member 12 blends smoothly together. The concave surface of the enlarged end 24 fits snugly with the other tubular member 16, and since the radius of the concave face is slightly less than that of the tubular member and the wings 32 are resilient, a snug joint is assured despite tolerance variations in the dimensions of the plastic fitting. This assures that some dimensional variation in the fitting can be tolerated without impairing the integrity or appearance of the joint which would not be the case if an attempt were made to make the concave face of the plastic fitting exactly the same radius as the tubular member.

By bonding the fitting to the tubular members, an exceptionally tight joint is assured. The fastener is completely hidden inside the fitting, so it does not detract from the appearance of the joint.

Having thus described my invention, I claim:

1. A fitting for joining together two tubular members at an angle to each other, said fitting comprising a molded plastic body of generally cylindrical configuration having a first end and a second end, said first end being larger than said second end and offset radially therefrom by a step, said first end being substantially equal in diameter to that of one of said two tubular members and having a concave face recessed axially thereof, said concave face having a radius substantially slightly smaller than that of said one of said two tubular members to provide resilient wings which resiliently fit the outside of said one of said two tubular members, said second end being tubular, having a slightly greater diameter than the inside diameter of the other of said two tubular members and having at least two longitudinal slots therein to provide resilient sections which resiliently fit telescopically within the inside of said other of said two tubular members and said body having a transverse wall therein through which a fastener may be secured to said one of said two tubular members, and said transverse wall having annularly distributed ribs extending into said first end, into which said face is recessed, to provide a more extended weldable surface for said concave face.

2. A fitting for joining together two tubular members at an angle to each other, said fitting comprising a molded plastic body of generally cylindrical configuration having a first end and a second end, said first end being larger than said second end and offset radially therefrom by a step, said first end being substantially equal in diameter to that of one of said two tubular members and having a concave face recessed axially thereof, said concave face having a radius substantially slightly smaller than that of said one of said two tubular members to provide resilient wings which resiliently fit the outside of said one of said two tubular members, said second end being tubular, having a slightly greater diameter than the inside diameter of the other of said two tubular members and having at least two longitudinal slots therein to provide resilient sections which resiliently fit telescopically within the inside of said other of said two tubular members and said body having a transverse wall therein through which a fastener may be secured to said one of said two tubular members, said first end having at least two concentric rings into which said face is recessed and said plastic body being secured to said two tubular members at said first and second ends with solvent cement.